US011731660B2

(12) United States Patent
Higashide et al.

(10) Patent No.: US 11,731,660 B2
(45) Date of Patent: Aug. 22, 2023

(54) AUTOMATIC RUNNING VEHICLE AND OPERATION MANAGEMENT DEVICE FOR AUTOMATIC RUNNING VEHICLE

(71) Applicants: TOYOTA JIDOSHA KABUSHIKI KAISHA, Toyota (JP); DENSO CORPORATION, Kariya (JP)

(72) Inventors: Hiroshi Higashide, Toyota (JP); Kenji Okazaki, Toyota (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 155 days.

(21) Appl. No.: 17/194,783

(22) Filed: Mar. 8, 2021

(65) Prior Publication Data

US 2021/0309260 A1    Oct. 7, 2021

(30) Foreign Application Priority Data

Apr. 2, 2020    (JP) ................... 2020-066775

(51) Int. Cl.
*B60W 60/00*    (2020.01)
*G08G 1/00*    (2006.01)
*G06V 20/56*    (2022.01)

(52) U.S. Cl.
CPC ......... *B60W 60/0027* (2020.02); *G06V 20/56* (2022.01); *G08G 1/20* (2013.01); *G08G 1/22* (2013.01); *B60W 2420/403* (2013.01); *B60W 2554/4049* (2020.02)

(58) Field of Classification Search
CPC ..... B60W 60/0027; B60W 2554/4049; B60W 2420/403; G06V 20/56; G08G 1/20; G08G 1/22
See application file for complete search history.

(56) References Cited

U.S. PATENT DOCUMENTS

| 10,353,387 | B2* | 7/2019 | Stenneth | ............... G05D 1/0297 |
| 10,896,606 | B1* | 1/2021 | Hayes | .................. G05D 1/0022 |
| 2002/0133285 | A1* | 9/2002 | Hirasago | ................ B60K 35/00 |
| | | | | 701/96 |
| 2010/0114541 | A1* | 5/2010 | Johnson | ................. G06N 5/003 |
| | | | | 703/2 |
| 2013/0080041 | A1* | 3/2013 | Kumabe | ................... G08G 1/22 |
| | | | | 701/117 |
| 2014/0095058 | A1* | 4/2014 | Patel | ....................... G08G 1/20 |
| | | | | 701/117 |

(Continued)

FOREIGN PATENT DOCUMENTS

| CN | 104269048 A | 1/2015 |
| JP | H06-4798 A | 1/1994 |

(Continued)

*Primary Examiner* — Hussein Elchanti
(74) *Attorney, Agent, or Firm* — Oliff PLC

(57) ABSTRACT

An automatic running vehicle executes regular operation control based on an operation schedule provided from an operation management device. The automatic running vehicle includes an automatic running control unit. The automatic running control unit executes retreat control to move to a retreat position on the predetermined route and stop there upon receipt of a retreat instruction from the operation management device or an immediately following overtaking vehicle.

2 Claims, 14 Drawing Sheets

(56) References Cited

U.S. PATENT DOCUMENTS

| | | | |
|---|---|---|---|
| 2014/0236414 A1* | 8/2014 | Droz | G08G 1/015 701/1 |
| 2015/0294430 A1 | 10/2015 | Huang et al. | |
| 2018/0120861 A1* | 5/2018 | Saxena | G05D 1/0291 |
| 2018/0255562 A1* | 9/2018 | Cho | H04W 72/10 |
| 2019/0044728 A1* | 2/2019 | Karmoose | H04L 9/0643 |
| 2019/0258270 A1 | 8/2019 | Yamamuro et al. | |
| 2019/0349719 A1* | 11/2019 | Pattan | H04W 4/08 |
| 2019/0378418 A1* | 12/2019 | Menadue | H04W 4/46 |
| 2020/0186290 A1* | 6/2020 | Zhang | H04L 1/0031 |
| 2020/0312133 A1* | 10/2020 | Wang | H04W 4/024 |
| 2021/0070291 A1* | 3/2021 | Yu | B60W 40/107 |
| 2021/0264793 A1* | 8/2021 | Shuman | H04W 52/10 |
| 2021/0350707 A1* | 11/2021 | Ucar | H04W 4/08 |
| 2022/0104200 A1* | 3/2022 | Zang | H04W 72/02 |

FOREIGN PATENT DOCUMENTS

| | | |
|---|---|---|
| JP | 2005-222144 A | 8/2005 |
| JP | 2019-144668 A | 8/2019 |

* cited by examiner

AUTOMATIC RUNNING VEHICLE AND OPERATION MANAGEMENT DEVICE FOR AUTOMATIC RUNNING VEHICLE

CROSS REFERENCE TO RELATED APPLICATION

This application claims priority to Japanese Patent Application No. 2020-066775, filed on Apr. 2, 2020, which is incorporated herein by reference in its entirety including the specification, claims, drawings, and abstract.

TECHNICAL FIELD

This specification discloses an automatic running vehicle that automatically runs along a predetermined route, and an operation management device that manages the operation of a plurality of automatic running vehicles.

BACKGROUND

In recent years, there has been suggested a traffic system using vehicles capable of automatic running. For example, JP 2005-222144 A describes that an instruction signal regarding the operation of a bus is sent from a management center to each of buses that are running along a dedicated road, based on the boarding rate, speed, and location of the bus.

Here, for example, in a vehicle with a relatively high boarding rate; that is, a crowded vehicle, passengers cannot readily move inside the vehicle and get on or off the vehicle at bus stops. This likely causes delay in operation. With delay caused, the vehicle may arrive at subsequent bus stops with delay, which increases the number of people waiting for the vehicle at the respective bus stops. Arrival of a crowded vehicle there may possibly increase the delay.

Consequently, the operation interval between the delayed vehicle and its following vehicle running on schedule becomes shorter. That is, the period of time after departure of the delayed vehicle from the bus stop to arrival of the following vehicle at the bus stop becomes shorter. Accordingly, a relatively smaller number of people get on the following vehicle. As such, the boarding rate of the immediately following vehicle of a delayed vehicle may be low. The following vehicle's overtaking the delayed vehicle to head for a bus stop prior to the delayed vehicle can eliminate the delay.

In view of the above, this specification discloses an automatic running vehicle and an operation management device for the automatic running device, that can ensure safety when a vehicle following a delayed vehicle overtakes the delayed vehicle in the case where a delayed vehicle is caused.

SUMMARY

An automatic running vehicle disclosed in this specification runs automatically along a predetermined route. The automatic running vehicle includes an automatic running control unit for executing regular operation control, based on an operation schedule provided from an operation management device, and for executing retreat control for moving to a retreat position along the predetermined route upon receipt of a retreat instruction from the operation management device or an overtaking vehicle that immediately follows the automatic running vehicle.

According to the above-described structure, upon receipt of a retreat instruction, a vehicle to be overtaken moves to a retreat position along the predetermined route, whereby an overtaking path is ensured. Moreover, after having moved to the retreat position, the vehicle stops, which can prevent intersection of the vehicles in overtaking.

In the above-described structure, the automatic running control unit may release the retreat control upon receipt of an overtaking completion notice from the operation management device.

According to the above-described structure, the stop state is maintained until completion of overtaking, which ensures safety in overtaking.

In the above-described structure, the automatic running vehicle may further include a sensor for obtaining surrounding environment information in the forward direction. In this case, when the overtaking vehicle is recognized, based on the surrounding environment information obtained by the sensor, at a position farther in the forward direction by a predetermined or longer distance, the automatic running control unit may release the retreat control.

According to the above-described structure, as the stop state is released upon recognition of the overtaking vehicle running ahead of the delayed vehicle, safety in overtaking is ensured.

In the above-described structure, the predetermined route may be a circulating route. In this case, an operation schedule for one round of the predetermined route may be provided at an operation schedule update point provided along the predetermined route. Further, the operation schedule may include a target update point passing time at which the automatic running vehicle passes through the operation schedule update point next time and an operation interval between automatic vehicles running along the predetermined route. Further, the automatic running vehicle may further include a schedule change unit for changing the operation schedule such that the target update point passing time is delayed by an amount corresponding to the operation interval, owing to overtaking by the overtaking vehicle.

The above-described structure can eliminate a discrepancy relative to the regular operation schedule by the time of provision of an operation schedule for the next round.

An operation management device for an automatic running vehicle, disclosed in this specification, manages the operation of a plurality of vehicles for automatic running along a predetermined route. The operation management device includes an operation schedule providing unit, an operating situation obtaining unit, a delayed vehicle extraction unit, and an overtaking instruction unit. The operation schedule providing unit provides an operation schedule to each of operating vehicles that are automatically running along the predetermined route. The operating situation obtaining unit obtains an operating situation information of the plurality of operating vehicles on the predetermined route. The delayed vehicle extraction unit extracts from among the plurality of operating vehicles a delayed vehicle that is delayed in actual operation relative to the operation schedule, based on the operating situation information of each of the operating vehicle. The overtaking instruction unit sends a retreat instruction to the delayed vehicle to move to a retreat position along the predetermined route and to stop there, and outputs an overtaking instruction to a following vehicle that immediately follows the delayed vehicle to overtake the delayed vehicle.

The above-described structure can ensure an overtaking path as a vehicle to be overtaken moves to a retreat position along the predetermined route upon receipt of an overtaking instruction, as described above.

The technique disclosed in this specification makes it possible to ensure safety, when a delayed vehicle is caused, in overtaking the delayed vehicle by a vehicle following the delayed vehicle.

BRIEF DESCRIPTION OF DRAWINGS

Embodiment(s) of the present disclosure will be described based on the following figures, wherein.

DESCRIPTION OF EMBODIMENTS

Figure 1:
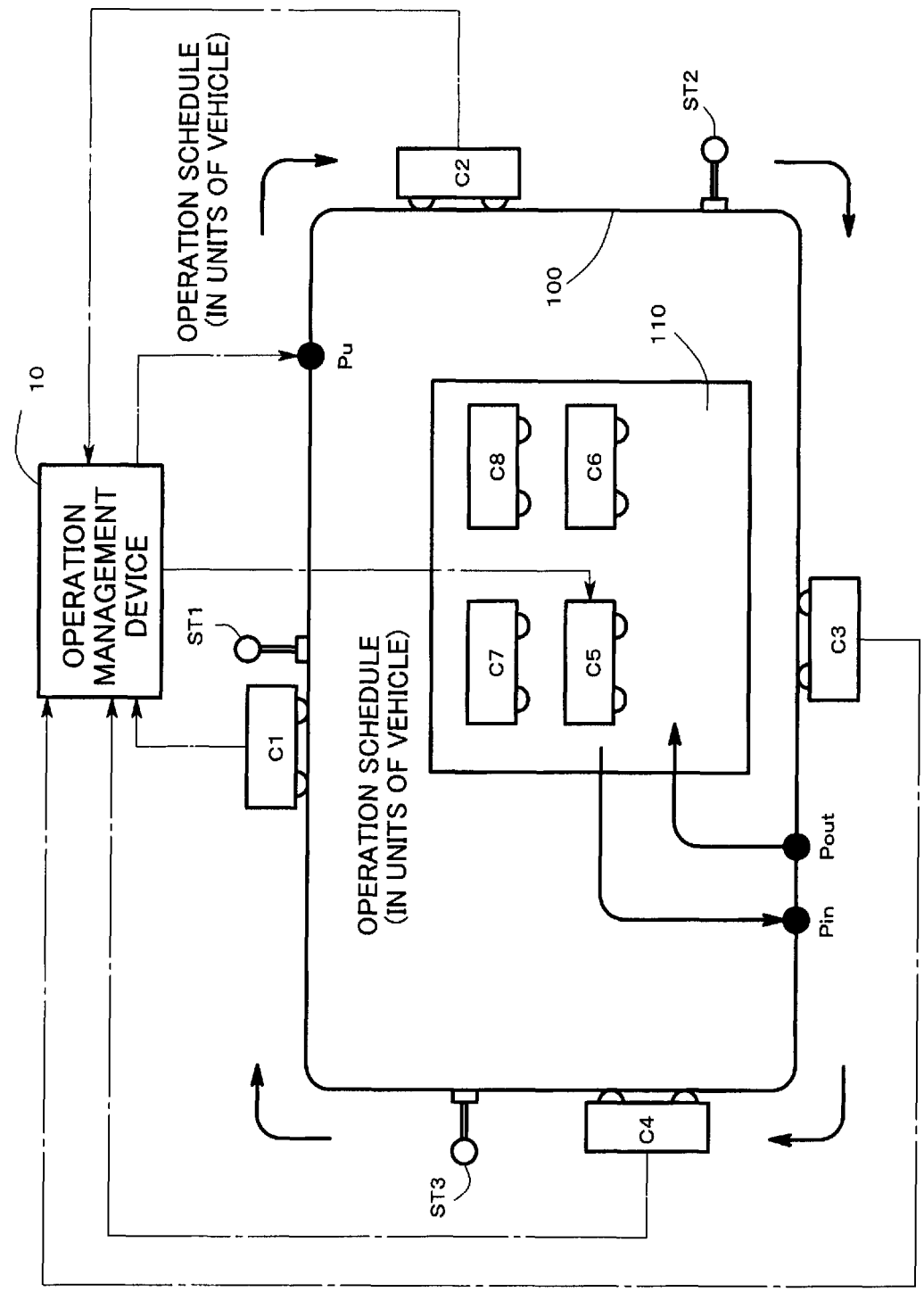
FIG. 1 is a schematic diagram of a traffic system including an automatic running vehicle and an operation management device according to an embodiment.

FIG. 1 schematically illustrates an example of a traffic system including automatic running vehicles C1 to C8 and an operation management device 10 according to an embodiment. This traffic system includes a plurality of bus stops ST1 to ST3 set along a predetermined route 100.

Note that the plurality of automatic running vehicles C1 to C8 will be hereinafter simply referred to as "vehicles C" without suffixed numbers for distinction when distinction is not made. Similarly, the plurality of bus stops ST1 to ST3 as well will be simply referred to as "bus stops ST" when distinction is unnecessary.

In the traffic system exemplified in FIG. 1, the vehicles C run along the predetermined route 100 to transport multiple unspecific users. As exemplified in FIG. 1, the predetermined route 100 may be a circulating route. The vehicles C run one way, as indicated by the illustrated arrows, along the predetermined route 100 in a circulating manner to go around the bus stops ST1 to ST3 located along the predetermined route 100.

The predetermined route 100 may be a dedicated road, for example, where only the vehicles C are allowed to run. In the case where the vehicles C are trains, the predetermined route 100 may be a loop railway. Alternatively, the predetermined route 100 may be a route set on a general road where vehicles other than the vehicles C are also allowed to run.

The traffic system further includes a garage 110 connected to the predetermined route 100. In FIG. 1, the automatic running vehicles C5 to C8 on standby in the garage 110 are illustrated as examples. As connection points to the garage 110, a put-out point Pout and an put-in point Pin are defined on the predetermined route 100. In the example illustrated in FIG. 1, the put-out point Pout and the put-in point Pin are provided between the bus stop ST2 and the bus stop ST3. The automatic running vehicles C1 to C4 running along the predetermined route 100 enter the garage 110 via the put-out point Pout. Meanwhile, the automatic running vehicles C5 to C8 on standby in the garage 110 are put onto the predetermined route 100 via the put-in point Pin. To avoid intersection between a vehicle C being put out and a vehicle C being put in, the put-out point Pout is defined upstream of the put-in point Pin.

The predetermined route 100 further includes an operation schedule update point Pu (an operation schedule update position) where the respective automatic running vehicles C1 to C4 in operation are provided with operation schedules. At the operation schedule update point Pu, the operation management device 10 provides each vehicle C passing through the point with an operation schedule for one circulation with the operation schedule update point Pu as a start. As described above, the operation schedule for each vehicle C is changed every passage (that is, every circulation) of the operation schedule update point Pu. Details of a method for providing an operation schedule will be described later.

<Vehicle Structure>

Each vehicle C is a vehicle capable of automatic running along the predetermined route 100 and functions, for example, as a vehicle for transporting multiple unspecific users from a predetermined bus stop ST to another bus stop ST. A vehicle C may be, for example, a bus.

Figure 2:
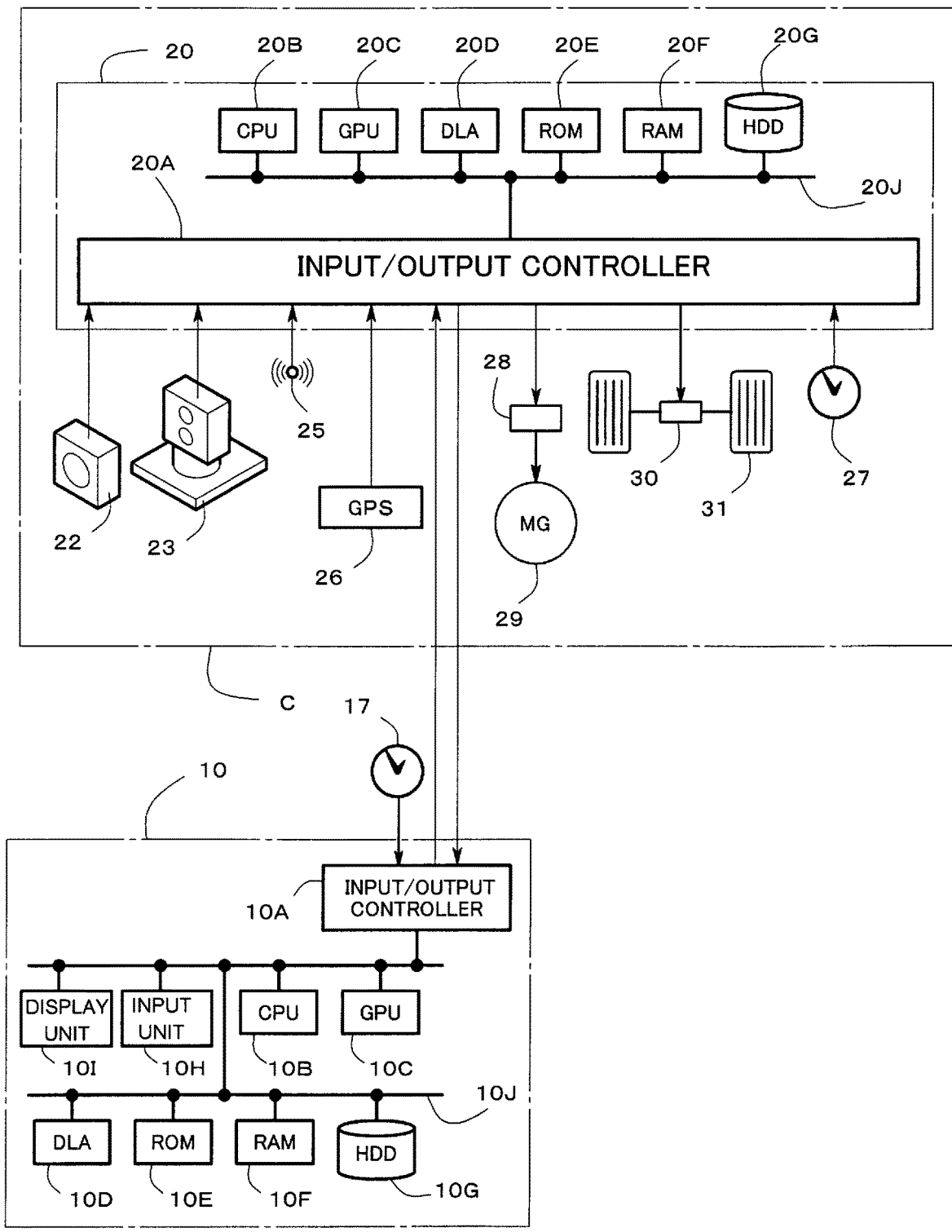
FIG. 2 is a diagram illustrating the hardware structure of the operation management device and the automatic running vehicle.
Figure 3:
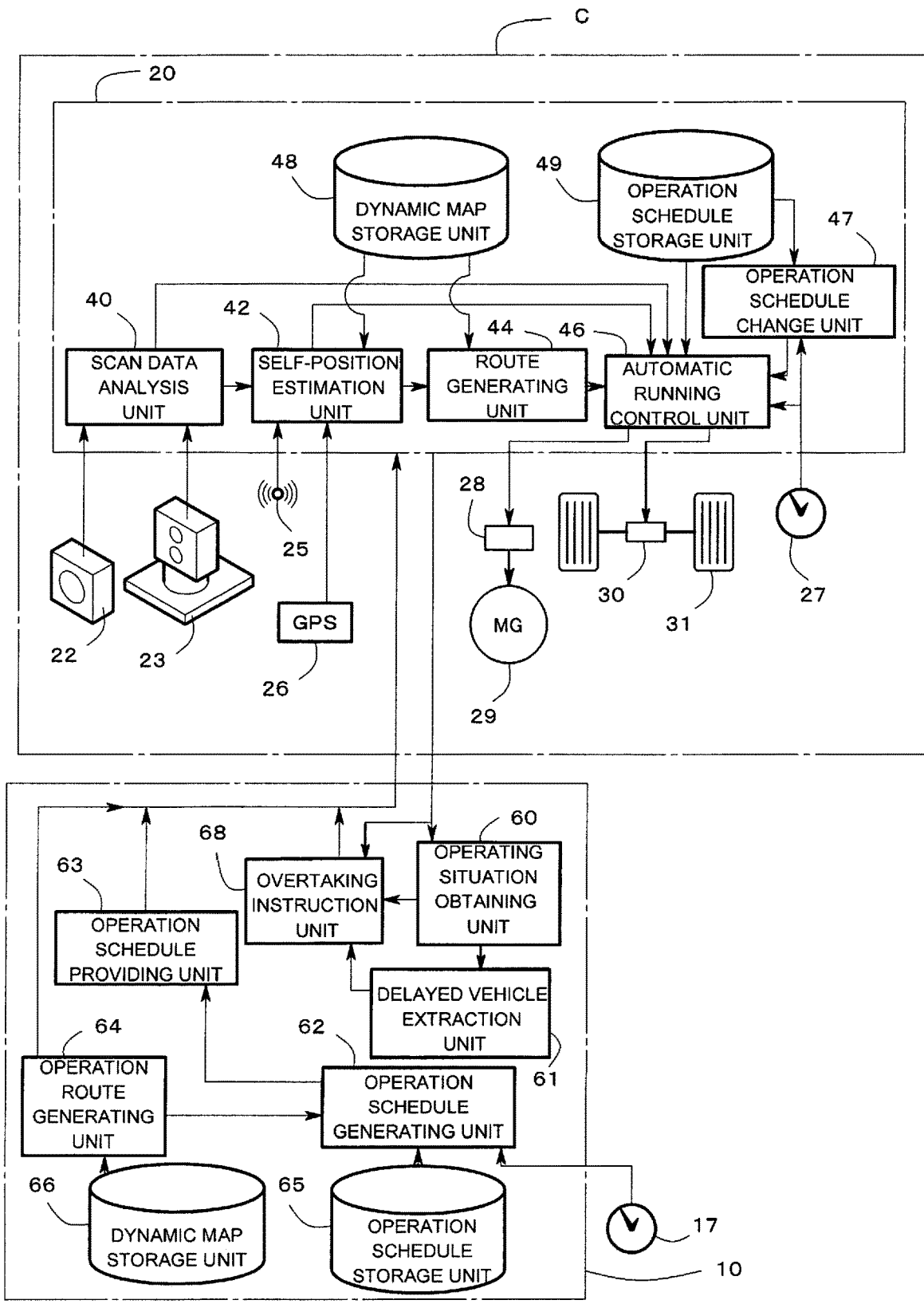
FIG. 3 is a functional block diagram of the operation management device and the automatic running vehicle.

A vehicle C is a vehicle capable of automatic running. For example, a vehicle C is a vehicle that satisfies the levels 3 to 5 defined by the Society of Automotive Engineers, Inc. (SAE) in the U.S.A. FIG. 2 illustrates an exemplary hardware structure of the vehicle C and the operation management device 10. FIG. 3 illustrates functional blocks of the vehicle C and the operation management device 10 together with the hardware.

As exemplified in FIG. 2 and FIG. 3, the vehicle C is an electrical vehicle having a rotary electric machine 29 (a motor) as a driving source and a battery, not illustrated, as a power source. The vehicle C is capable of communication with the operation management device 10; that is, exchange of data, by means of radio communication.

Although not illustrated in FIG. 2 and FIG. 3, communication is possible among a plurality of vehicles C running along the predetermined route 100. For example, as will be described later, a following vehicle of a delayed vehicle can send a retreat instruction to the delayed vehicle, and the delayed vehicle can send a retreat completion notice to the following vehicle.

The vehicle C includes a mechanism for enabling automatic running. Specifically, a vehicle C includes a control unit 20, a camera 22, a lidar unit 23, a proximity sensor 25, a GPS receiver 26, a clock 27, a driving mechanism 28, and a steering mechanism 30.

The camera 22 captures an image in the field of view substantially identical to that of the lidar unit 23. The camera 22 includes an image sensor, such as a CMOS sensor or a CCD sensor. An image captured by the camera 22 (a captured image) is utilized in automatic running control, as will be described later.

The lidar unit 23 (a LiDAR unit) is a sensor for automatic running, such as a distance sensor utilizing infrared radiation. For example, the lidar unit 23 emits infrared laser beams in the horizontal direction and the vertical direction for scanning to obtain three dimensional (3D) point data; that is, three-dimensionally aligned distance data on the surrounding environment of the vehicle C. The camera 22 and the lidar unit 23 are mounted together as one sensor unit on each of the four surfaces of a vehicle C; namely, for example, the front surface, the rear surface, and the side surfaces connecting the front surface and the rear surface.

The proximity sensor 25 is, for example, a sonar sensor, and, for example, determines the distance between the vehicle C and a curbstone, or the boundary between a driveway and a sidewalk, when the vehicle C is about to stop at a bus stop ST. This determination enables control to stop the vehicle C at a position close enough to the curbstone, or a so-called positive fitness control. The proximity sensor 25 is provided, for example, on each side surface of the vehicle C and each corner between the front surface and a side surface.

The GPS receiver 26 receives a positioning signal from a GPS satellite. For example, receiving this positioning signal enables obtaining of the current position (latitude and longitude) of the vehicle C.

The control unit 20 may be, for example, an electronic control unit (ECU) of the vehicle C, and includes a computer. The control unit 20, exemplified in FIG. 2, includes an input/output controller 20A for controlling data input/output. The control unit 20 further includes a central processing unit (CPU) 20B, a graphics processing unit (GPU) 20C, and a deep learning accelerator (DLA) 20D as calculation devices. The control unit 20 still further includes a read-only memory (ROM) 20E, a random-access memory (RAM) 20F, and a hard disk drive 20G (HDD) as storage units. These structural components are connected to an internal bus 20J.

FIG. 3 illustrates exemplary functional blocks of the control unit 20. The functional blocks include a scan data analysis unit 40, a self-position estimation unit 42, a route generating unit 44, an automatic running control unit 46, and an operation schedule change unit 47. The control unit 20 includes a dynamic map storage unit 48 and an operation schedule storage unit 49 as storage units.

The dynamic map storage unit 48 stores dynamic map data on the predetermined route 100 and areas around the predetermined route 100. A dynamic map is a 3D map, for example, including the locations and shapes (3D shapes) of roads (driveways and sidewalks). The dynamic map may further include the positions of lanes, crossings, stop lines, or the like, drawn on roads. The dynamic map still further includes the positions and shapes (3D shapes) of structures, such as buildings and signals for vehicles. The dynamic map data are provided by the operation management device 10.

The operation schedule storage unit 49 stores an operation schedule of the vehicle C equipped with the storage unit. As described above, the operation schedule is updated at the operation schedule update point Pu (refer to FIG. 1) for every circulation of the predetermined route 100 by the vehicle C.

The vehicle C automatically runs according to the data on the predetermined route 100 stored in the dynamic map storage unit 48. For automatic running, 3D point data on the surrounding environment of the vehicle C are obtained by the lidar unit 23. Further, the camera 22 captures an image of the surrounding environment of the vehicle C.

An object shown in an image captured by the camera 22 is analyzed by the scan data analysis unit 40. For example, if an object is detected in a captured image by means of a known deep learning method, such as Single Shot Multibox Detector (SSD) utilizing supervised learning, or You Only Look Once (YOLO), attributes (bus stops ST, foot passengers, structures, or the like) of the detected object are recognized.

The scan data analysis unit 40 further obtains the 3D point data (lidar data) from the lidar unit 23. Superimposition of the captured image by the camera 22 and the lidar data one on the other enables knowing, for example, an object having what attribute (a bus stop ST, a foot passenger, a structure, or the like) is located how far from the vehicle equipped with the scan data analysis unit 40.

The self-position estimation unit 42 estimates the position of the vehicle carrying the self-position estimation unit 42, or a self-position, in a dynamic map, based on the self-position (latitude and longitude) received from the GPS receiver 26. The estimated self-position is used for route generation, and is also sent to the operation management device 10 together with the time information obtained from the clock 27.

The route generating unit 44 generates a route from the estimated self-position to the closest target point. For example, a route from the self-position to a bus stop ST is generated. In the case where an obstacle is detected along a route directly connecting the self-position and the bus stop ST, based on the 3D point data obtained by the lidar unit 23 and the captured image captured by the camera 22, a route that avoids the obstacle is generated.

Based on the data obtained above; namely, data obtained through superimposition of the captured image and the lidar data, the self-position, the generated route, and the operation schedule, the automatic running control unit 46 executes automatic running control for the vehicle C. For example, the running speed in running on a generated route is automatically controlled so as to be the same as a target speed V0 (to be described later) defined according to the regular operation schedule. Specifically, the automatic running control unit 46 controls the driving mechanism 28, such as an inverter, to maintain the speed of the vehicle C at the target speed V0. In addition, the automatic running control unit 46 controls the steering mechanism 30, such as an actuator, to operate the wheels 31 such that the vehicle C moves along the determined route.

Note that the automatic running control by the automatic running control unit 46, based on the regular operation schedule, is referred to as regular operation control. Also, as will be described later, as automatic running control for a vehicle to be overtaken in overtaking; that is, a delayed vehicle, the automatic running control unit 46 executes retreat control. Retreat control includes retreat-running control for having the delayed vehicle move to a retreat position (for example, a shoulder) on the predetermined route 100 and stop control for stopping thereafter.

At a bus stop ST, the automatic running control unit 46 stops the vehicle C, and then opens the door (not illustrated). At that time, referring to the clock 27, the automatic running unit 46 maintains the vehicle C stopped until a target departure time Td* (to be described later) defined according to the operation schedule. Upon completion of the passengers' getting off or on the vehicle C and arrival of the target departure time Td*, the automatic running control unit 46 closes the door and has the vehicle C depart.

The operation schedule change unit 47 changes the regular operation schedule stored in the operation schedule storage unit 49 when the vehicle overtakes its preceding vehicle or is overtaken by its following vehicle, as will be described later in detail.

<Structure of Operation Management Device>

The operation management device 10 manages the operation of a plurality of vehicles C that automatically run along the predetermined route 100. The operation management device 10 is installed, for example, in a management company that manages the operation of the vehicles C. The operation management device 10 includes, for example, a computer. FIG. 2 exemplifies the hardware structure of the operation management device 10.

Similar to the hardware structure of the vehicle C, the operation management device 10 includes an input/output controller 10A, a CPU 10B, a GPU 10C, a DLA 10D, a ROM 10E, a RAM 10F, and a hard disk drive 10G (HDD). These structural components are connected to an internal bus 10J.

The operation management device 10 additionally includes an input unit 10H, such as a keyboard or a mouse, for arbitrarily inputting data. Further, the operation management device 10 includes a display unit 10I, such as a display, for viewing and displaying an operation schedule or the like. The input unit 10H and the display unit 10I are connected to the internal bus 10J.

FIG. 3 illustrates exemplified functional blocks of the operation management device 10. The operation management device 10 includes an operation schedule storage unit 65 and a dynamic map storage unit 66 as storage units. The operation management device 10 additionally includes an operating situation obtaining unit 60, a delayed vehicle extraction unit 61, an operation schedule generating unit 62, an operation schedule providing unit 63, an operation route generating unit 64, and an overtaking instruction unit 68 as functional units.

The operation route generating unit 64 generates a route along which the vehicles C runs; namely, the predetermined route 100. For example, the predetermined route 100 is generated through selection of routes from among roads including branches. Dynamic map data corresponding to the generated predetermined route 100 are extracted from the dynamic map storage unit 66, and sent to the vehicles C.

The operation schedule generating unit 62 generates an operation schedule to be provided to a plurality of operating vehicles C running along the predetermined route 100. As will be described later, the operation schedule generating unit 62 can generate a regular operation schedule. Also as will be described later, the operation schedule generating unit 62 can calculate a target arrival time Ta* and a target departure time Td* at each of the bus stops ST1 to ST3, based on the generated operation schedule and the time information obtained from the clock 17. Note that the clock 17, provided outside the operation management device 10 in FIG. 2, may be provided inside the operation management device 10.

The operation schedule providing unit 63 provides the operation schedule generated by the operation schedule generating unit 62 to an operating vehicle C at the operation schedule update point Pu (the operation schedule update position). As described above, the operation schedule providing unit 63 provides an operation schedule for one round of the predetermined route 100, or a circulating route, to an operating vehicle C automatically running along the predetermined route 100 and passing through the operation schedule update point Pu.

The operating situation obtaining unit 60 obtains operating situation information from an operating vehicle C (vehicles C1 to C4 in FIG. 1) running along the predetermined route 100. The operating situation information includes the current position, the number of passengers on board, the state of charge (SOC) of the battery, information on various devices obtained by an onboard sensor, or the like. Based on the operating situations of the respective operating vehicles C, the delayed vehicle extraction unit 61 extracts from among the plurality of operating vehicles C a delayed vehicle that is delayed in actual operation relative to the operation schedule.

When a delayed vehicle is caused, the overtaking instruction unit 68 sends a retreat instruction to the delayed vehicle. In addition, the overtaking instruction unit 68 sends an overtaking instruction to the immediately following vehicle of the delayed vehicle. In overtaking, the overtaking instruction unit 68 outputs a retreat instruction to the delayed vehicle. This overtaking process will be described later.

<Operation Schedule>

Figure 4:
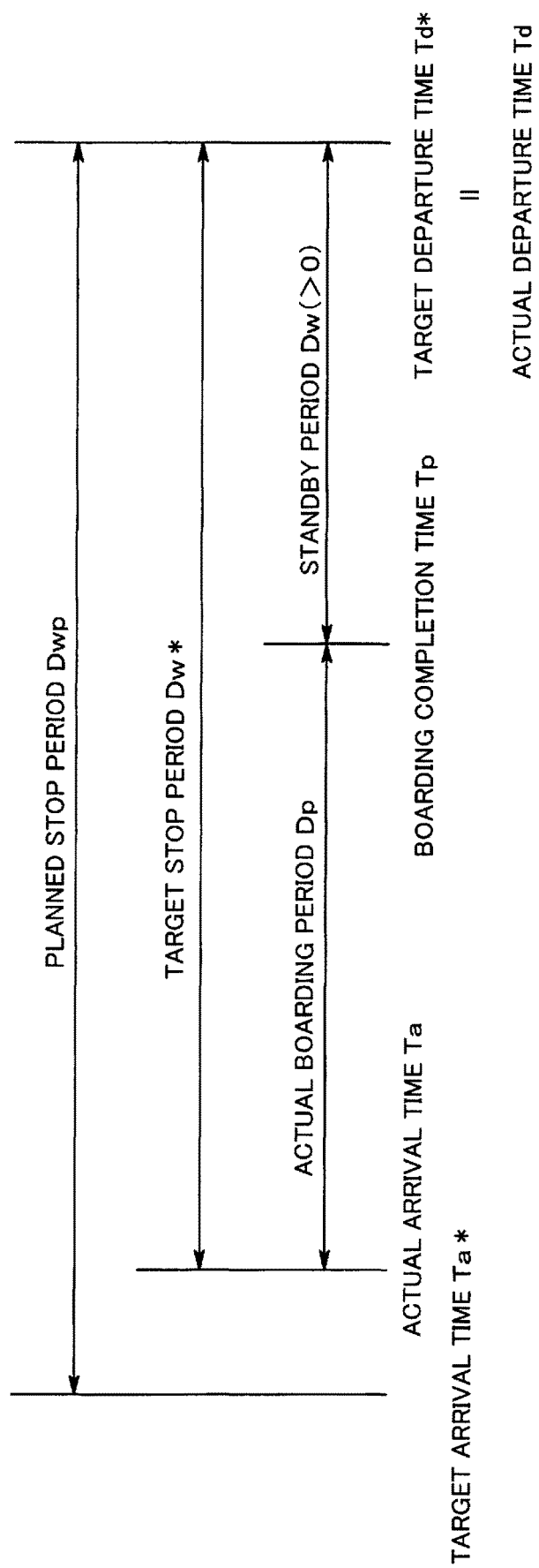
FIG. 4 is a diagram (½) explaining terms used in generation of an operation schedule.
Figure 5:
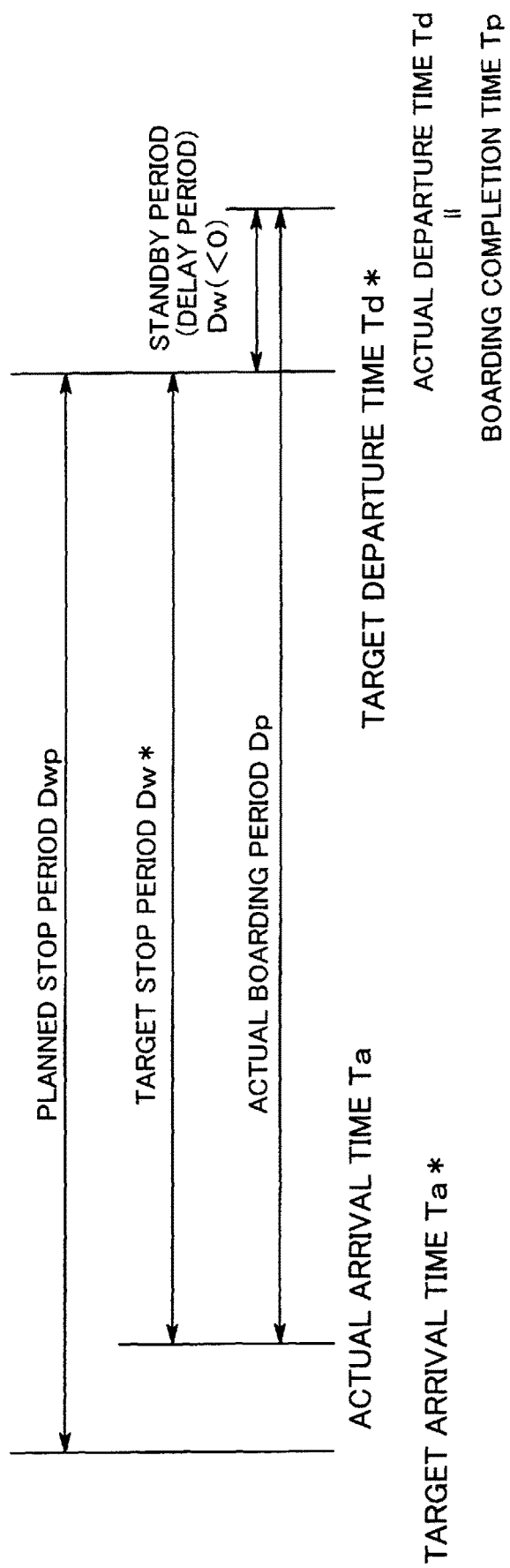
FIG. 5 is a diagram (2/2) explaining terms used in generation of an operation schedule.

Terms to be used in generating or changing operation schedule are shown as examples in FIG. 4 and FIG. 5. As exemplified in FIG. 4, for regular operation schedule, a target arrival time Ta* at which a vehicle C arrives at each bus stop ST and a target departure time Td* at which the vehicle C departs the bus stop ST are determined for every vehicle C. The period of time from the target arrival time Ta* to the target departure time Td* is a period of time during which the vehicle C remains stopped according to the schedule, and is referred to as a planned stop period Dwp.

In actual operation, a vehicle C may arrive at a bus stop ST at a time different from the target arrival time Ta* due to delay attributed to a longer period of time taken for passengers to get on or off the vehicle C at a previous bus stop or, for example, heavy traffic along the predetermined route C. This actual arrival time is referred to as an actual arrival time Ta. The period of time from the actual arrival time Ta to the target departure time Td* is a target period of time for having the vehicle C depart the bus stop ST on schedule, and is referred to as a target stop period Dw*.

A period of time actually taken for passengers to get on or off a vehicle C is referred to as an actual boarding period Dp. An actual boarding period Dp is a period of time from the actual arrival time Ta to a boarding completion time Tp. A boarding completion time Tp can be estimated by analyzing by the scan data analysis unit 40 a captured image captured by the camera 22 mounted on a side surface of the vehicle C and the 3D point data provided by the lidar unit 23. For example, a later one of the time points; namely, the time at which all awaiting passengers have gotten on the vehicle C through the door with none left waiting for boarding in an image obtained through analysis by the scan data analysis unit 40, and the time at which all passengers to get off the vehicle C have gotten off the vehicle C through the door with none left for getting off the vehicle C in the image, is determined as a boarding completion time Tp. A period of time obtained by subtracting the actual boarding period Dp from the target stop period Dw* is referred to as a standby period Dw.

FIG. 4 illustrates an exemplary case in which the standby period Dw takes a positive value. In this case, the standby period Dw corresponds to a period of time from the boarding completion time Tp to the target departure time Td*; that is, a period of time during which the vehicle C is waiting for the departure time after completion of the passengers' getting on or off the vehicle C. After elapse of the standby period Dw and upon arrival of the target departure time Td*, the vehicle C departs the bus stop. That is, in the case where the standby period Dw takes a positive value, an actual departure time Td, or a time at which the vehicle C actually departs the bus stop ST, is basically the same as the target departure time Td*.

FIG. 5 illustrates an exemplary case in which the actual boarding period Dp exceeds the target stop period Dw* and the standby period Dw thus takes a negative value; that is, a case in which the standby period Dw is expressed in the form of a delay period Dw. In this case, as passengers keep getting on or off the vehicle C even after elapse of the target departure time Td*, and the vehicle C departs immediately after completion of the passengers' getting on or off the vehicle C, the boarding completion time Tp is basically the same as the actual departure time Td.

<Regular Operation Schedule>

Figure 6:
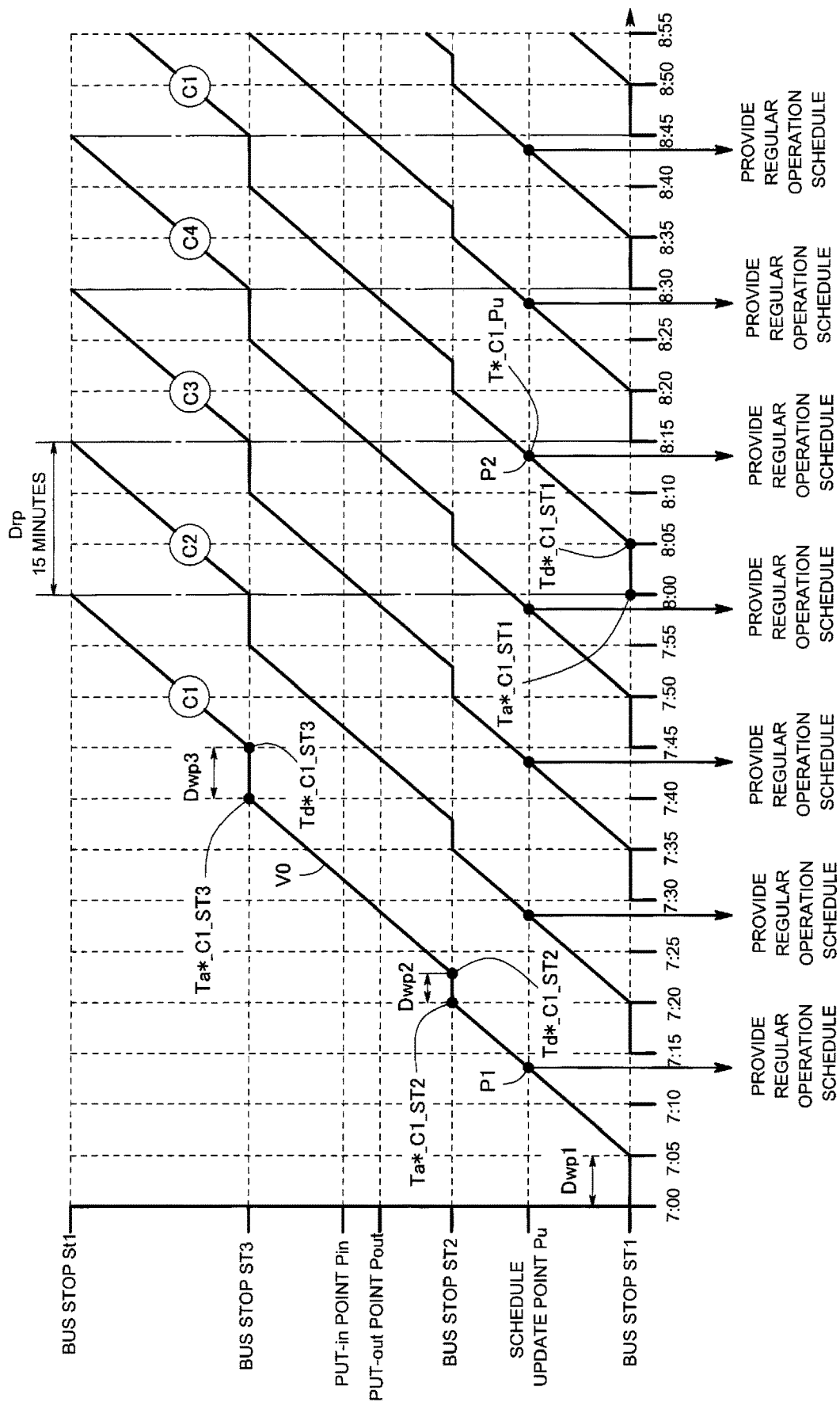
FIG. 6 is a diagram describing an exemplary regular operation schedule.

FIG. 6 illustrates an exemplary diagram based on the regular operation schedule. The horizontal axis of the diagram indicates time, and the vertical axis indicates respective points on the predetermined route 100, including the bus stops ST1 to ST3, the operation schedule update point Pu, the put-out point Pout, and the put-in points Pin. Such a regular operation schedule is generated by the operation schedule generating unit 62.

In FIG. 6, regular operation schedule for four vehicles C1 to C4 to run at planned operation intervals Drp of 15 minutes is prepared. The regular operation schedule refers to operation schedule to be applied to when vehicles are automatically running along the predetermined route 100 in circulation while the number of vehicles automatically running along the predetermined route 100 remains unchanged. In other words, the regular operation schedule is applied when vehicles C run in circulation along the predetermined route 100 with no increase or decrease in the number of vehicles C.

For example, according to the regular operation schedule, planned stop periods Dwp1, Dwp2, Dwp3 at the respective bus stops ST1 to ST3 for the respective vehicles C are set uniform so that the operation intervals between the respective operating vehicles C running along the predetermined route 100 are uniform, and the target speed V0 as well is set uniform among the respective vehicles C.

The target speeds V0 and the planned stop periods Dwp1, Dwp2, Dwp3 at the respective bus stops ST1 to ST3, which are set according to the regular operation schedule, are arbitrarily referred to as "regular values" as well. In view of the above, the regular operation schedule can be rephrased as an operation schedule prepared using regular values. Regular operation schedule is determined by the operation schedule generating unit 62 of the operation management device 10, for example, before actual operation according to the operation schedule starts.

A time at which the vehicle C passes each point on the predetermined route 100 is obtained based on the target speed V0 and the planned stop periods Dwp1, Dwp2, Dwp3. For example, a time at which the vehicle C passes through the operation schedule update point Pu is obtained from the clock 17 (refer to FIG. 2).

For example, FIG. 6 shows a passing time of the vehicle C1. A target arrival time Ta*_C1_ST2 at which the vehicle C1 arrives at the bus stop ST2 is obtained, with the above-described passing time at the operation schedule update point Pu as a start, based on the distance to the bus stop ST2 and the target speed V0. Further, a target departure time Td*_C1_ST2 is obtained, based on the planned stop period Dwp2.

Similarly, a target arrival time Ta*_C1_ST1 and a target arrival time Ta*_C1_ST3 at which the vehicle C1 arrives at the respective bus stops ST1, ST3 are obtained, based on the respective distances between the respective bus stops ST, the target speed V0, and the respective planned stop periods Dwp1, Dwp3. Further, a target departure time Td*_C1_ST1 and a target departure time Td*_C1_ST3 at which the vehicle C1 departs the respective bus stops ST1, ST3 are obtained. Still further, a target passing time T*_C1_Pu at the operation schedule update point Pu is obtained, based on the distance from the bus stop ST1 to the operation schedule update point Pu, and the target speed V0.

The operation schedule providing unit 63 (FIG. 3) provides the regular operation schedule to each of the vehicles C1 to C4 at the operation schedule update point Pu when the vehicle passes through the operation schedule update point Pu (the operation schedule update position). In the above, the operation schedule providing unit 63 provides a regular operation schedule for one circulation to an operating vehicle C1 to C4 passing through the operation schedule update point Pu.

For example, when the operating vehicle C1 passes through the schedule update point Pu, operation schedule data on a period from a time when the operating vehicle C1 passes through the operation update point Pu to a time when the operating vehicle C1 will pass through the operation schedule update point Pu next time (for example, from the point P1 to point P2 in FIG. 6) are provided to the operating vehicle C1.

In the above, the operation schedule data to be provided to each operating vehicle Ck (k=1 to 4 when four vehicles are running) include target arrival time points Ta*_Ck_ST1 to Ta*_Ck_ST3 at which the operating vehicle Ck arrives at the respective bus stops ST1 to ST3, and target departure time points Td*_Ck_ST1 to Td*_Ck_ST3 at which the operating vehicle Ck departs the respective bus stops ST1 to ST3. Further, the operation schedule data to be provided to the operating Ck also include the planned stop periods Dwp1, Dwp2, Dwp3 at the respective bus stops ST1 to ST3 and the target speed V0. In addition, the operation schedule data to be provided to the operating vehicle Ck also include a target passing time T*_Ck_Pu at which the operating vehicle Ck will pass through the operation schedule update point Pu next time and the planned operation interval Drp between the respective operating vehicles Ck.

<Overtaking Process>

Figure 7:
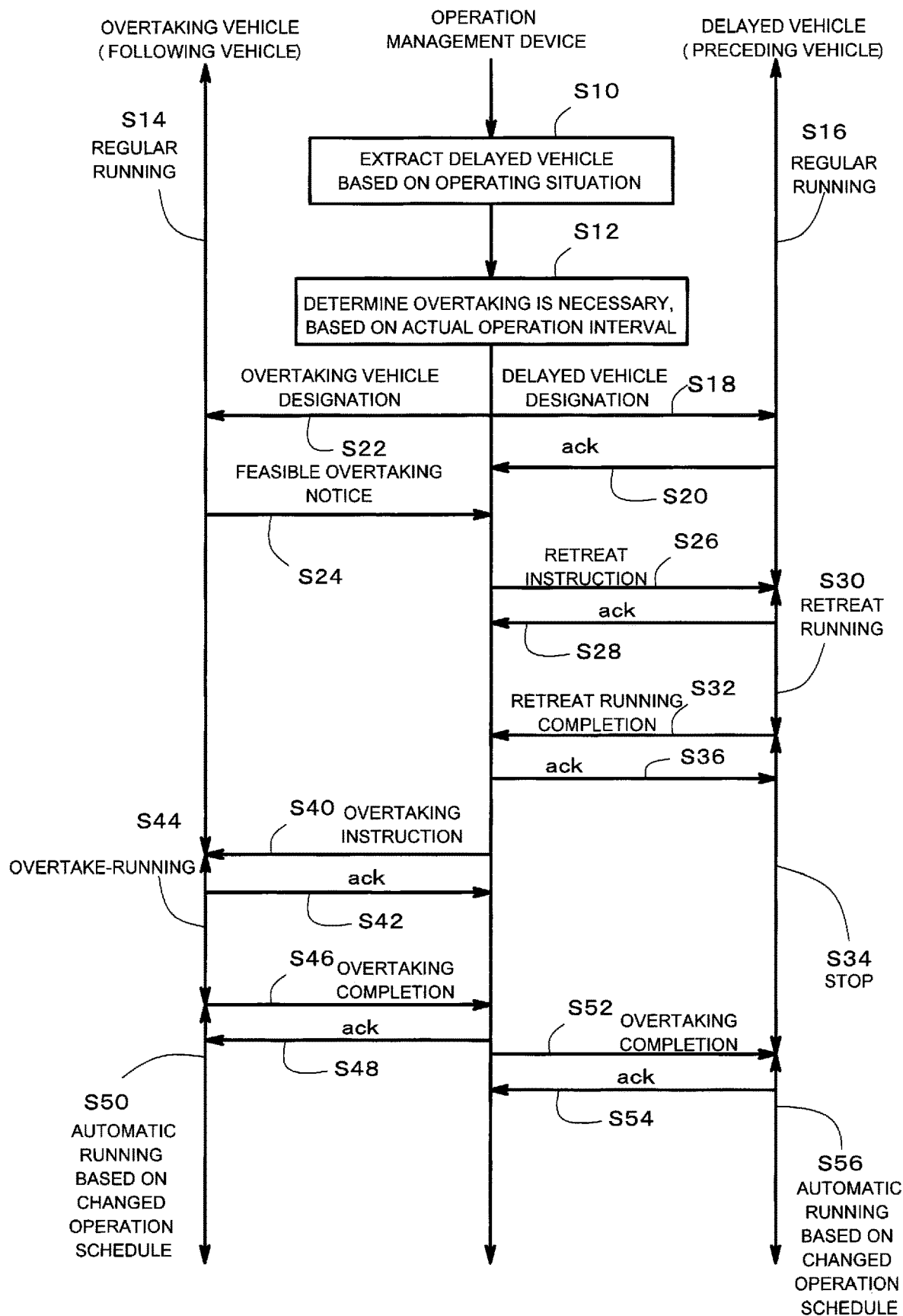
FIG. 7 is a flowchart of an exemplary overtaking process in a traffic system according to the embodiment.
Figure 8:
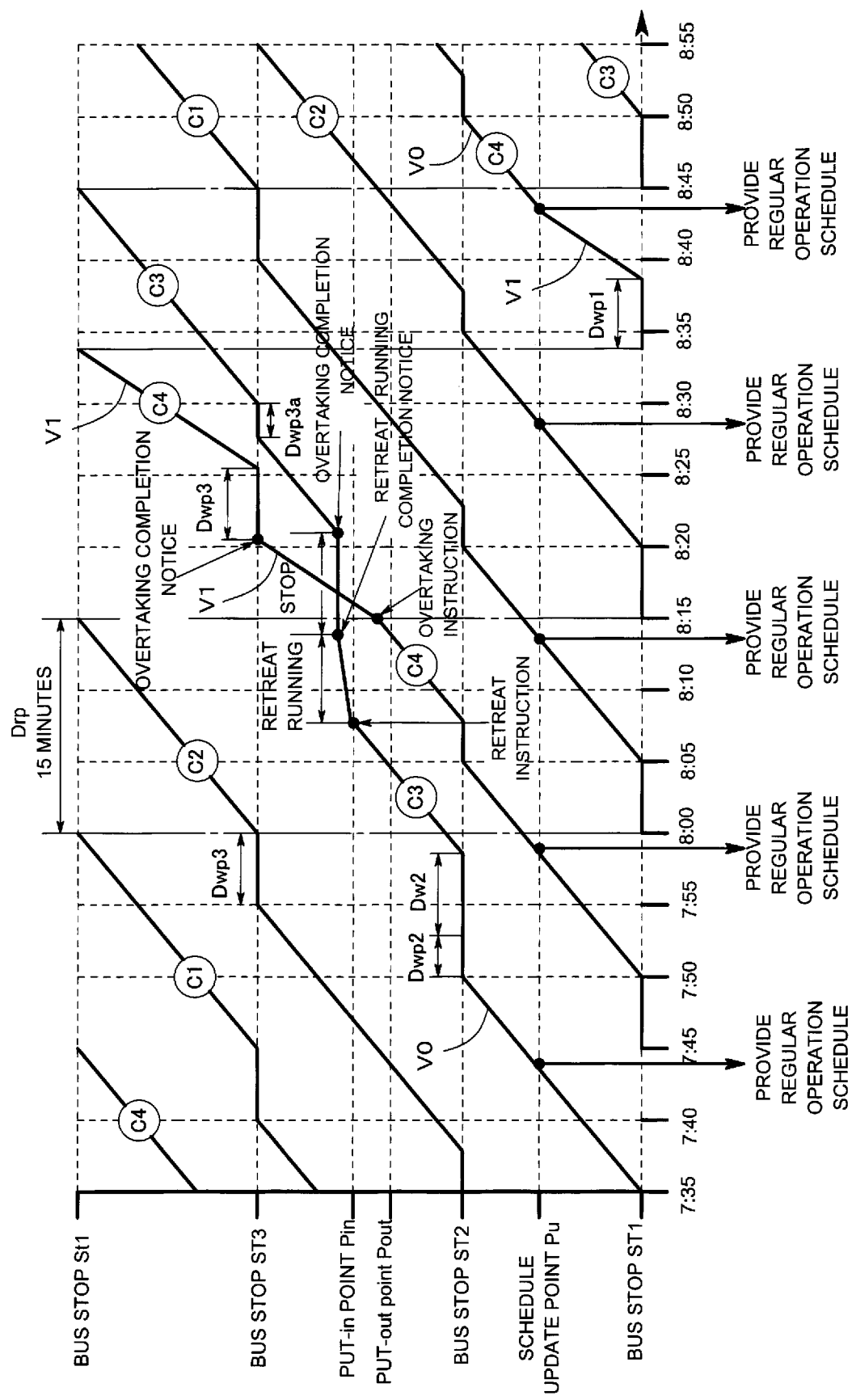
FIG. 8 is a diagram illustrating an exemplary diagram for an overtaking process.

FIG. 7 is an exemplary flowchart of the overtaking process according to this embodiment. FIG. 8 illustrates an exemplary diagram for an overtaking process.

The operating situation obtaining unit 60 of the operation management device 10 obtains an operating situation information from each of the operating vehicles C1 to C4. Specifically, the operating situation information is obtained for every predetermined interval; for example, for every 0.1 [μSec]. Further, the delayed vehicle extraction unit 61 extracts from among the operating vehicles C1 to C4 a vehicle delayed in actual operation relative to the regular operation schedule, based on the operating situation information obtained by the operating situation obtaining unit 60 (S10 in FIG. 7).

Specifically, the operating situation obtaining unit 60 obtains the current position from each of the operating vehicles C1 to C4. Further, the delayed vehicle extraction unit 61 obtains a delay period Dw of each vehicle, based on the obtained current position, the time at which the current position is obtained, or an obtained time, and the position and a target time at that position based on the regular operation schedule.

For example, in FIG. 8, the boarding period exceeds the planned stop period Dwp2 while the vehicle C3 is stopped at the bus stop ST2. That is, for example, passengers' getting on or off the vehicle C3 is completed at the time after elapse of the delay period Dw2 from the planned stop period Dwp2, and the vehicle C3 then departs the bus stop ST2. In the above, the delay period of the vehicle C3 is a delay period Dw2. An overtaking process will be hereinafter described, referring to the vehicle C3 as a delayed vehicle and the vehicle C4 as a following vehicle (an overtaking vehicle). Generally, when the vehicle Ck is designated as a delayed vehicle, a vehicle C_(k+1) is designated as an overtaking vehicle The delayed vehicle extraction unit 61 determines whether overtaking the delayed vehicle C3 is necessary. For example, the delayed vehicle extraction unit 61 obtains an actual operation interval between the delayed vehicle C3 and its immediately following vehicle C4. When the actual operation interval becomes shorter than a predetermined threshold period, the delayed vehicle extraction unit 61 determines that overtaking the delayed vehicle C3 is necessary (S12 in FIG. 7). This determination enables overtaking in accordance with the closeness in actual operation interval. Note that a predetermined threshold period for the actual operation interval may be, for example, a value corresponding to 50% of the planned operation interval based on the regular operation schedule.

After determination that overtaking the delayed vehicle C3 is necessary, the delayed vehicle extraction unit 61 informs the overtaking instruction unit 68 of designation of the operating vehicle C3 as a delayed vehicle and the operating vehicle C4 immediately following the operating vehicle C3 as an overtaking vehicle to overtake the vehicle.

The overtaking instruction unit 68 outputs a delayed vehicle designation instruction to the delayed vehicle C3 (S18 in FIG. 7). Having received the instruction, the delayed vehicle C3 outputs an acknowledgement signal to the overtaking instruction unit 68 (S20 in FIG. 7). Note that the automatic running control unit 46 of the delayed vehicle C3 keeps regular operation control, or automatic running control based on the regular operation schedule, also after receipt of the delayed vehicle designation instruction until receipt of the retreat instruction (S26 in FIG. 7).

The overtaking instruction unit 68 outputs an overtaking vehicle designation instruction to the following vehicle C4 of the delayed vehicle C3 (S22 in FIG. 7). The designated overtaking vehicle C4 checks its condition (for example, the state of charge of a battery), and then outputs a feasible overtaking notice to the overtaking instruction unit 68 to notify that overtaking is feasible (S24 in FIG. 7). The following vehicle C4 will be hereinafter arbitrarily referred to as an overtaking vehicle C4. The automatic running control unit 46 of the overtaking vehicle C4 continues regular operation control also after receipt of the overtaking vehicle designation instruction (S14 in FIG. 7) until receipt of the overtaking instruction (S40 in FIG. 7).

Having received the acknowledgement signal from the delayed vehicle C3 and the feasible overtaking notice from the overtaking vehicle C4, the overtaking instruction unit 68 outputs a retreat instruction to the delayed vehicle C3 (S26 in FIG. 7). Having received the retreat instruction, the control unit 20 of the delayed vehicle C3 outputs an acknowledgement signal to the overtaking instruction unit 68 (S28 in FIG. 7).

Further, the automatic running control unit 46 of the delayed vehicle C3 switches the regular operation control to execute retreat control. The retreat control includes retreat-running control for moving the delayed vehicle C3 to a retreat position on the predetermined route 100 (S30 in FIG. 7) and stop control for stopping the delayed vehicle C3 having moved to the retreat position (S34 in FIG. 7). The retreat position may be, for example, a shoulder of the predetermined route 100. Referring to FIG. 8, the speed for retreat-running may be slower than the target speed V0 based on the regular operation schedule.

In retreat-running, the automatic running control unit 46 controls the driving mechanism 28 (refer to FIG. 3) and the steering mechanism 30, based on the surrounding environment of the vehicle, analyzed by the scan data analysis unit 40, to move the delayed vehicle C3 to a retreat position (a shoulder) on the predetermined route 100.

With the delayed vehicle C3 having moved through retreat-running to the retreat position of the predetermined route 100, the control unit 20 of the delayed vehicle C3 outputs a retreat-running completion notice to the overtaking instruction unit 68 (S32 in FIG. 7). The automatic running control unit 46 of the delayed vehicle C3 stops the delayed vehicle C3 at that position (the retreat position) (S34 in FIG. 7). With the delayed vehicle C3 retreated to the retreat position, a path (an overtaking path) for the overtaking vehicle C4 is ensured. Upon receipt of the retreat-running completion notice, the overtaking instruction unit 68 of the operation management device 10 outputs an acknowledgement signal to the delayed vehicle C3 (S36 in FIG. 7).

Then, the overtaking instruction unit 68 outputs an overtaking instruction to the overtaking vehicle C4 to overtake the immediately preceding delayed vehicle C3 (S40 in FIG. 7). Upon receipt of the instruction, the automatic running control unit 46 of the overtaking vehicle C4 executes overtake-running control for overtaking the delayed vehicle C3 (S44 in FIG. 7). In response to the overtaking instruction, the automatic running control unit 46 outputs an acknowledgement signal to the overtaking instruction unit 68 (S42 in FIG. 7). As described in the diagram in FIG. 8, the target speed V1 of the overtake-running may be faster than the target speed V0 defined according to the regular operation schedule.

Overtaking the delayed vehicle C3 by the overtaking vehicle C4 while the delayed vehicle C3 remains stopped enables highly safe overtaking; for example, overtaking with low possibility of intersection between these vehicles.

In overtake-running, the scan data analysis unit 40 of the overtaking vehicle C4 analyzes the surrounding environment information obtained from the camera 22 (refer to FIG. 3) and the lidar unit 23 of the overtaking vehicle C4 to recognize the delayed vehicle C3. Further, the route generating unit 44 generates a route that avoids the delayed vehicle C3 stopped, and executes overtake-running control to overtake the delayed vehicle C3 along the route. As described above, recognizing the surrounding situation with a function that is used in automatic running control enables highly safe overtaking.

After the overtaking vehicle C4 overtakes the delayed vehicle C3, for example, the automatic running control unit 46 controls the overtaking vehicle C4 such that the overtaking vehicle C4 continues running at the current overtaking speed V1 to the next bus stop ST3. Thereafter, the control unit 20 of the overtaking vehicle C4 outputs an overtaking completion signal to the overtaking instruction unit 68 (S46 in FIG. 7). Accordingly, the automatic running control unit 46 of the overtaking vehicle C4 releases the overtaking control, and then executes automatic running control (S50 in FIG. 7). In this case, as the overtaking ends up with discrepancy relative to the regular operation schedule, the operation schedule is changed in executing the automatic running control. The process for the change will be described later. Further, in executing automatic running control, the overtaking instruction unit 68 outputs an acknowledgement signal to the control unit 20 of the overtaking vehicle C4 (S48 in FIG. 7).

Upon receipt of the overtaking completion instruction from the overtaking vehicle C4, the overtaking instruction unit 68 outputs an overtaking completion notice to the delayed vehicle C3 (S52 in FIG. 7). Upon receipt of the notice, the automatic running control unit 46 of the delayed vehicle C3 releases the retreat control, and then executes automatic running control (S56 in FIG. 7). In this case, as the overtaking ends up with discrepancy relative to the regular operation schedule, the operation schedule is changed in executing the automatic running control. The process for the change will be described later. Further, in executing the automatic running control, the automatic running control unit 46 of the delayed vehicle C3 outputs an acknowledgement signal to the overtaking instruction unit 68 (S54 in FIG. 7).

<Operation Schedule after Overtaking>

After overtaking, the overtaking vehicle C4 and the delayed vehicle C3 change the regular operation schedule and run to the operation schedule update point Pu. Conceptually, the overtaking vehicle C4 changes the operation schedule such that the changed operation schedule follows the regular operation schedule of the delayed vehicle C3 so far. In addition, the operation schedule for the delayed vehicle C3 is changed so as to be similar to the regular operation schedule of the overtaking vehicle C4 so far.

Figure 9:
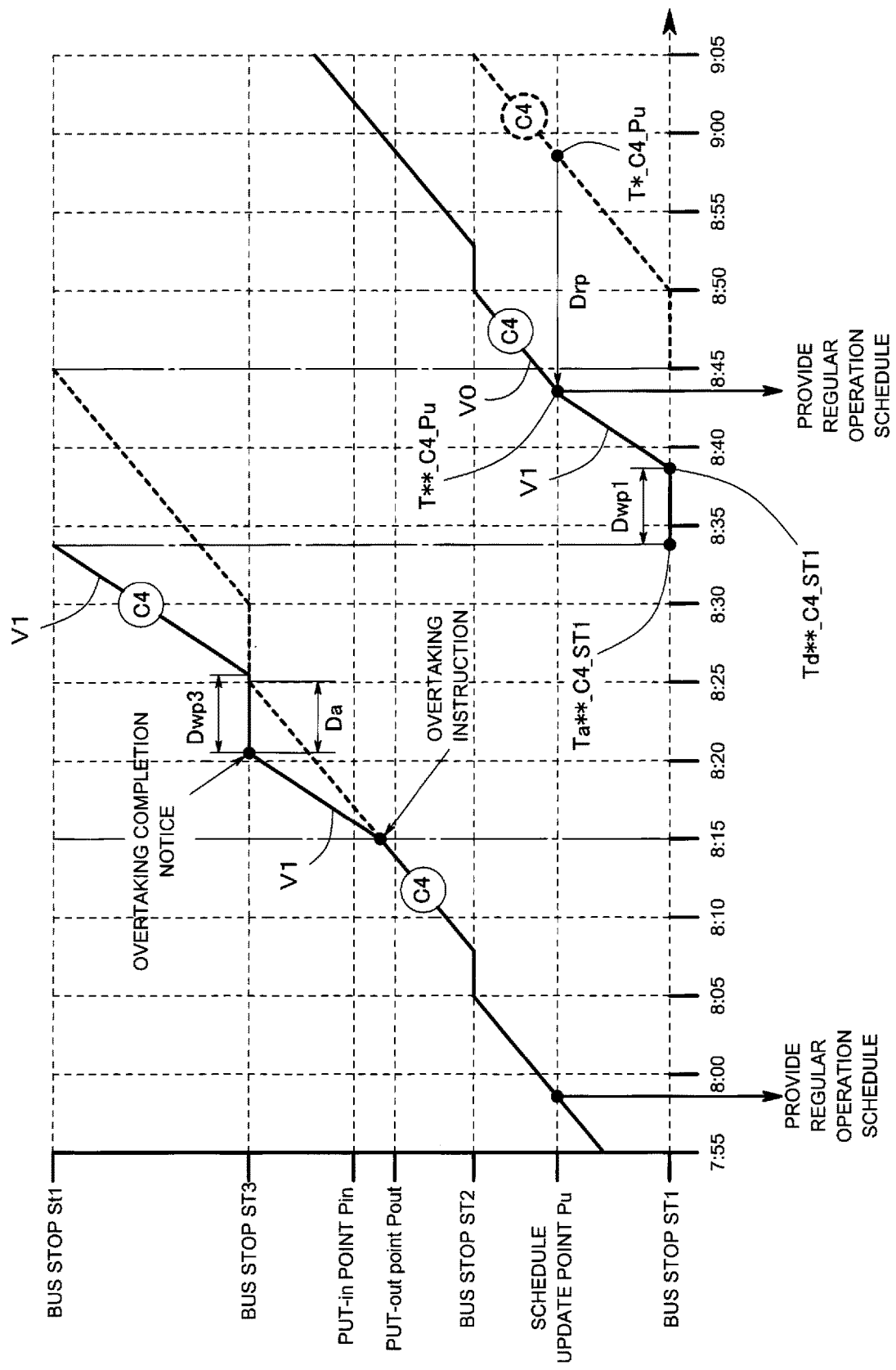
FIG. 9 is a diagram illustrating a diagram for a vehicle C4 extracted from FIG. 8.
Figure 10:
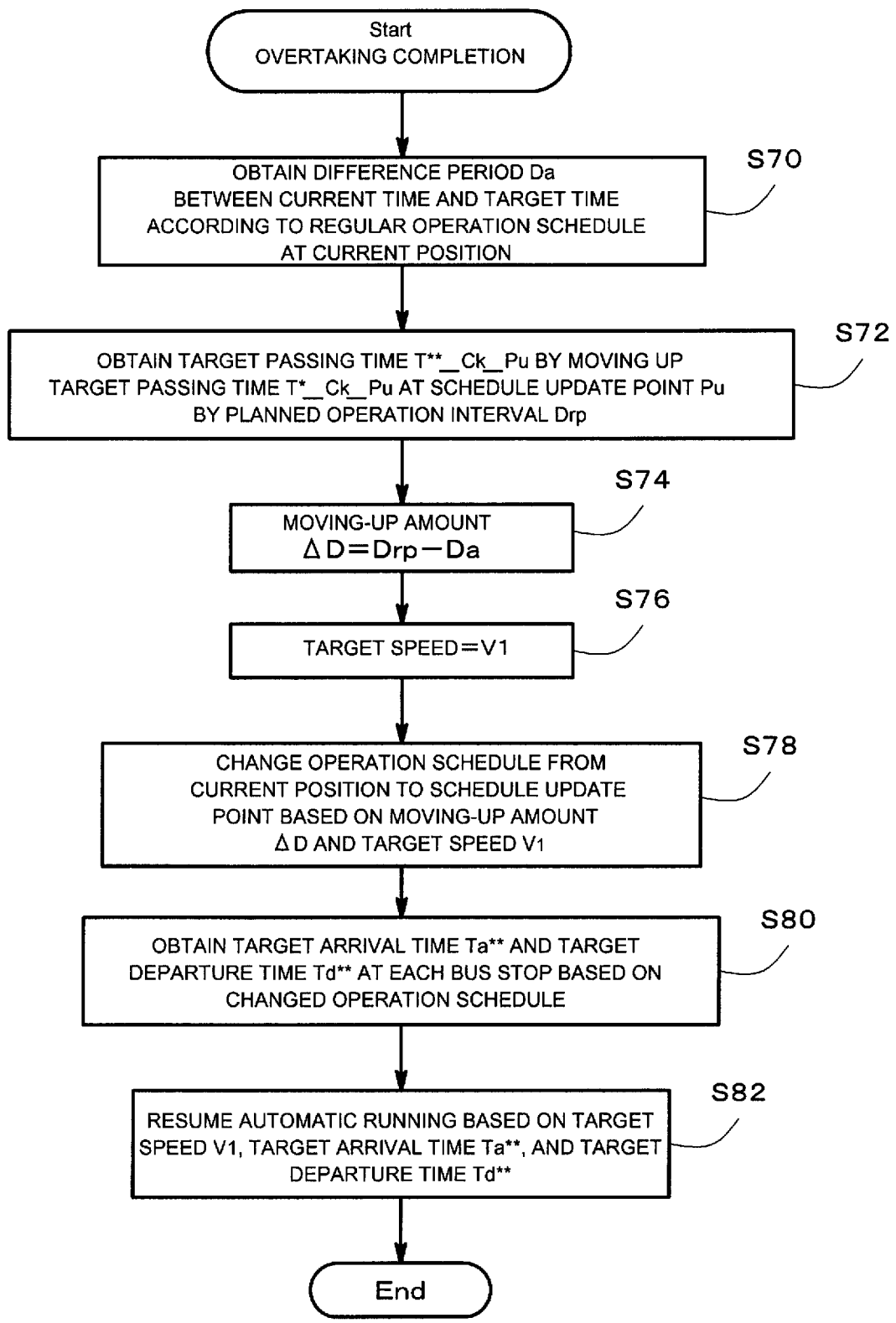
FIG. 10 is a flowchart of exemplary processing for changing the operation schedule of an overtaking vehicle.

FIG. 9 illustrates an exemplary diagram for the overtaking vehicle C4. FIG. 10 is an exemplary flowchart of changing the operation schedule. Note that the sign Ck in FIG. 10 represents a vehicle C and its ID number k (k=1 to 4 in the example in FIG. 8). The overtaking vehicle C4 having overtaken the delayed vehicle C3 and arrived at the bus stop ST3; that is, having completed overtaking, opens the door, not illustrated. Further, during this period, the operation schedule change unit 47 changes the regular operation schedule stored in the operation schedule storage unit 49 by moving up the regular operation schedule, owing to the overtaking of the delayed vehicle C3, which was its preceding vehicle.

The operation schedule change unit 47 of the overtaking vehicle C4 obtains the difference period Da (refer to FIG. 9) between the current time and the target time according to the regular operation schedule at the current time (S70 in FIG. 10). That is, the difference between the overtaking completion time and the target arrival time at the bus stop ST3 makes a difference period Da.

Thereafter, the operation schedule change unit 47 sets a new target passing time T_C4_Pu at the operation schedule update point Pu (S72 in FIG. 10). The target passing time T_C4_Pu is a time obtained by moving up the target passing time T*_C4_Pu at the operation schedule update point Pu defined according to the regular operation schedule by an amount corresponding to the planned operation interval Drp (fifteen minutes).

Further, the operation schedule change unit 47 obtains the moving-up amount ΔD for the operation schedule (S74 in FIG. 10). The moving-up amount ΔD is for subtraction of the moved-up amount caused in overtaking by running at the target speed V1 in overtaking; that is, "the planned operation interval Drp−difference period Da=moving-up amount ΔD".

Further, the operation schedule change unit 47 sets the target speed to the speed V1 (>V0) (S76 in FIG. 10). Then, the operation schedule change unit 47 changes a part of the regular operation schedule from the current position to the operation schedule update point Pu, based on the moving-up amount ΔD and the target speed V1 (S78 in FIG. 10).

For example, when a vehicle runs from the current position to the schedule update point Pu at the target speed V1, a moved-up amount relative to the case where the vehicle runs in that section at the target speed V0 is obtained. If the moved-up amount is less than the moving-up amount ΔD, the planned standby period at a bus stop ST1 located along the route from the current position to the operation schedule update point Pu is shortened from the period determined according to the regular operation schedule.

Based on the operation schedule changed as described above, the operation schedule change unit 47 obtains a target arrival time Ta_C4_ST1 and a target departure time Td_C4_ST1 at the bus stop ST1 along the route from the current position to the operation schedule update point Pu (S80 in FIG. 10). Further, the automatic running control unit 46 resumes automatic running, based on the target speed V1, the target arrival time Ta_C4_ST1, and the target departure time Td_C4_ST1 (S82 in FIG. 10).

As described above, running control by the automatic running control unit 46 of the overtaking vehicle C4 is executed based on the operation schedule obtained by shortening and changing the regular operation schedule. As such running control enables eliminating a delay of the overtaking vehicle C4 relative to the planned operation interval at the operation schedule update point Pu, a regular operation schedule is provided from the operation schedule providing unit 63 (refer to FIG. 3).

Meanwhile, the operation schedule change unit 47 of the delayed vehicle C3 as well, having been overtaken by the overtaking vehicle C4, changes the regular operation schedule for the delayed vehicle C3. Conceptually, the operation schedule for the delayed vehicle C3 is changed such that the changed schedule is similar to the regular operation schedule for the vehicle C4, which has followed the delayed vehicle C3 until the overtaking. For example, when the control unit 20 receives a stop release instruction from the overtaking instruction unit 68, the operation schedule change unit 47 changes the operation schedule.

Figure 11:
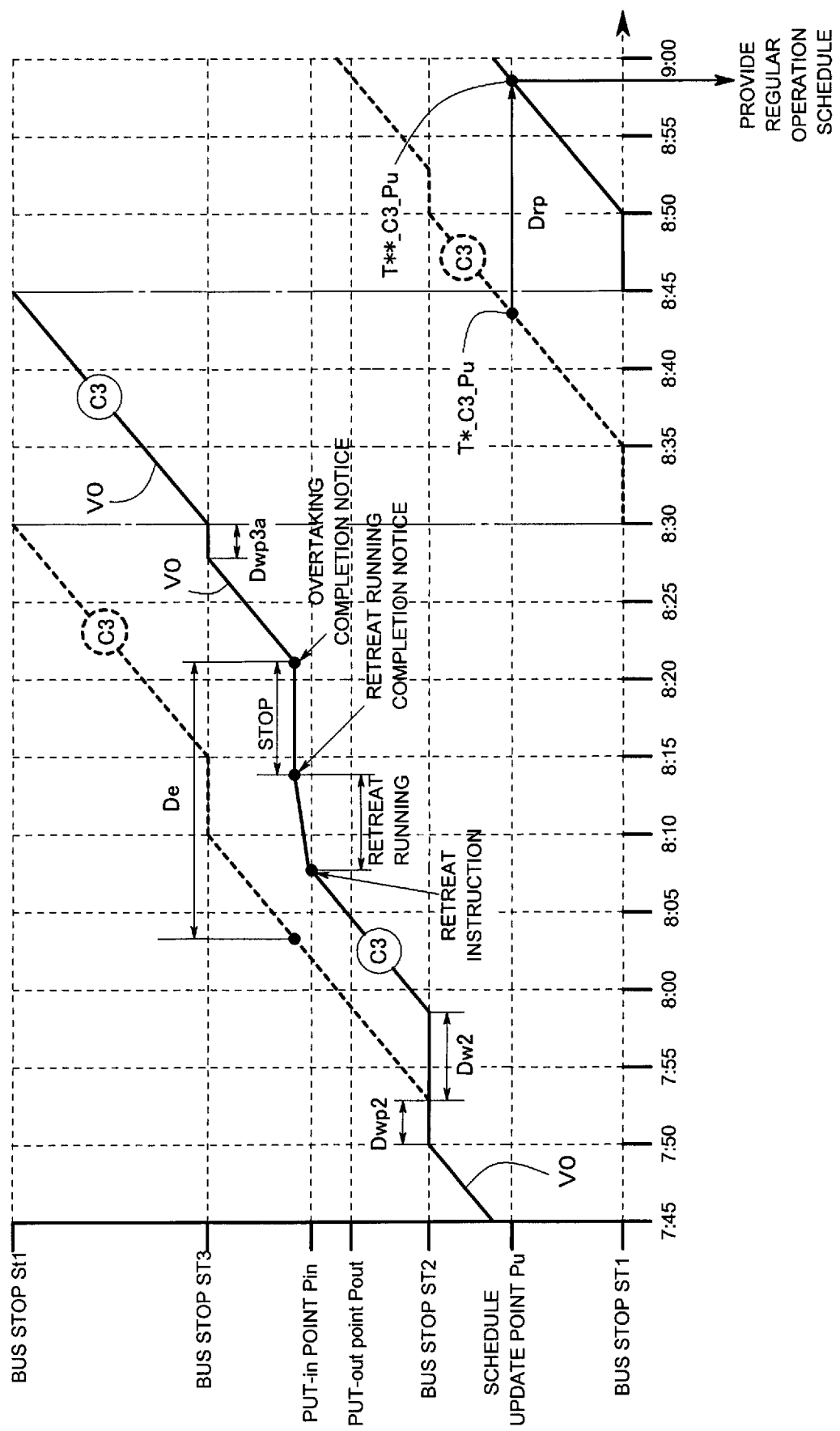
FIG. 11 is a diagram illustrating a diagram for a vehicle C3 extracted from FIG. 8.
Figure 12:
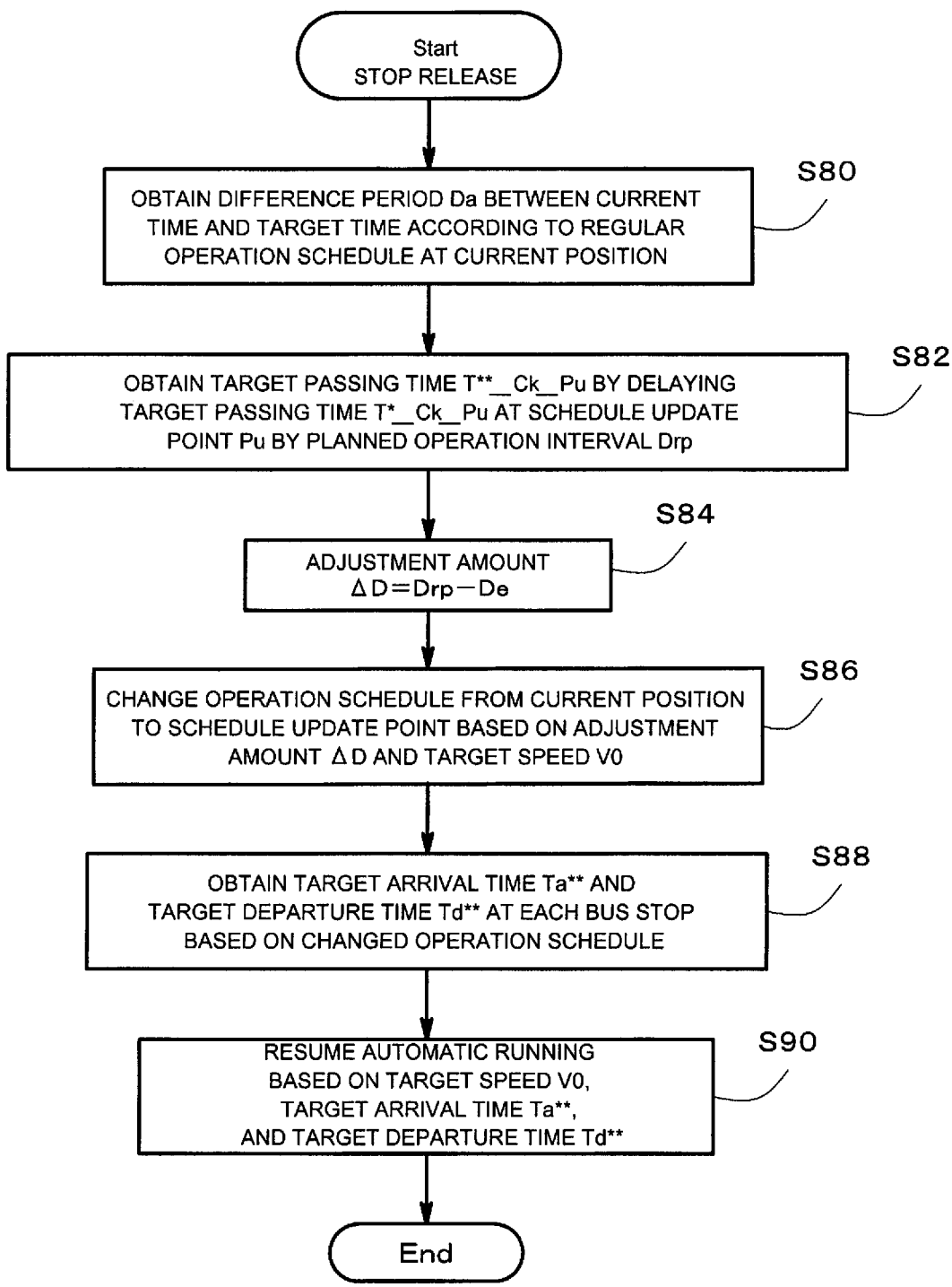
FIG. 12 is a flowchart of exemplary processing for changing the operation schedule of a delayed vehicle.

FIG. 11 illustrates an exemplary diagram for the delayed vehicle C3. FIG. 12 is an exemplary flowchart of changing the operation schedule. Note that the sign Ck in FIG. 12 represents a vehicle C and its ID number k (k=1 to 4 in the example in FIG. 8). Having received the stop release notice from the operation management device 10, the operation schedule change unit 47 of the delayed vehicle C3 changes the regular operation schedule stored in the operation schedule storage unit 49 by delaying the schedule.

The operation schedule change unit 47 of the delayed vehicle C3 obtains a difference period De (refer to FIG. 11) between the current time and the target time according to the regular operation schedule at the current position (S80 in FIG. 12).

Then, the operation schedule change unit 47 sets a new target passing time T_C3_Pu at the operation schedule update point Pu (S82 in FIG. 12). The target passing time T_C3_Pu is a time obtained by delaying a target passing time T*_C3_Pu at the operation schedule update point Pu defined according to the regular operation schedule by an amount corresponding to the planned operation interval Drp (fifteen minutes).

Further, the operation schedule change unit 47 obtains an adjustment amount ΔD for the operation schedule (S84 in FIG. 12). The adjustment amount ΔD is for subtraction of the delay period Dw2 caused in actual operation and a delay period caused due to retreat-running and stoppage of the vehicle when being overtaken, from the planned operation interval Drp; that is, "the planned operation interval Drp–the difference period De=adjustment amount ΔD".

Further, the operation schedule change unit 47 sets the target speed to V0, and changes a part of the regular operation schedule from the current position to the operation schedule update point Pu, based on the adjustment amount ΔD (S86 in FIG. 12).

For example, as the target speed V0 is kept at a value defined according to the regular operation schedule, the planned standby period at the bus stop ST1 located along the route from the current position to the operation schedule update point Pu is adjusted.

For example, in the case where the adjustment amount ΔD takes a positive value, the planned standby period at the bus stop ST1 is extended. Meanwhile, in the case where the adjustment amount ΔD takes a negative value, which means that the delay caused during the period from actual operation to completion of overtaking is longer than the planned operation interval Drp, the planned standby period at the bus stop ST1 is shortened.

Based on the operation schedule changed as described above, the operation schedule change unit 47 obtains the target arrival time Ta_C3_ST1 and the target departure time Td_C3_ST1 at the bus stop ST1 located on the route from the current position to the operation schedule update point Pu (S88 in FIG. 12). Further, the automatic running control unit 46 resumes automatic running, based on the target speed V0, the target arrival time Ta_C3_ST1, and the target departure time Td_C3_ST1 (S90 in FIG. 12).

As described above, running control by the automatic running control unit 46 of the delayed vehicle C3 is executed, based on the operation schedule obtained by changing the regular operation schedule. As such running control enables elimination of a discrepancy of the delayed vehicle C3 relative to the planned operation interval at the operation schedule update point Pu, a regular operation schedule is provided from the operation schedule providing unit 63 (refer to FIG. 3).

Another Example of Overtaking Process

Figure 13:
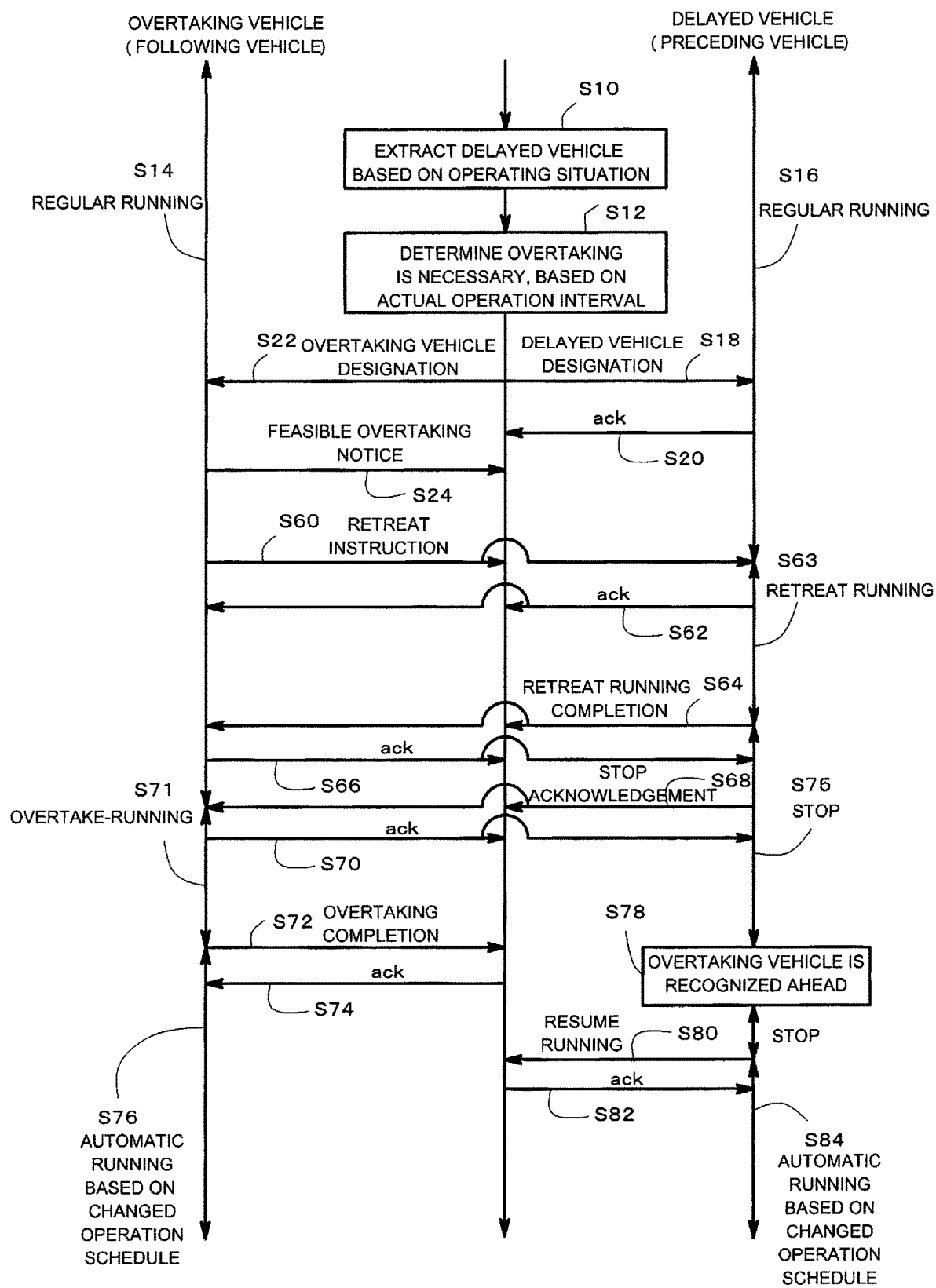
FIG. 13 is a flowchart of the overtaking process according to another example.
Figure 14:
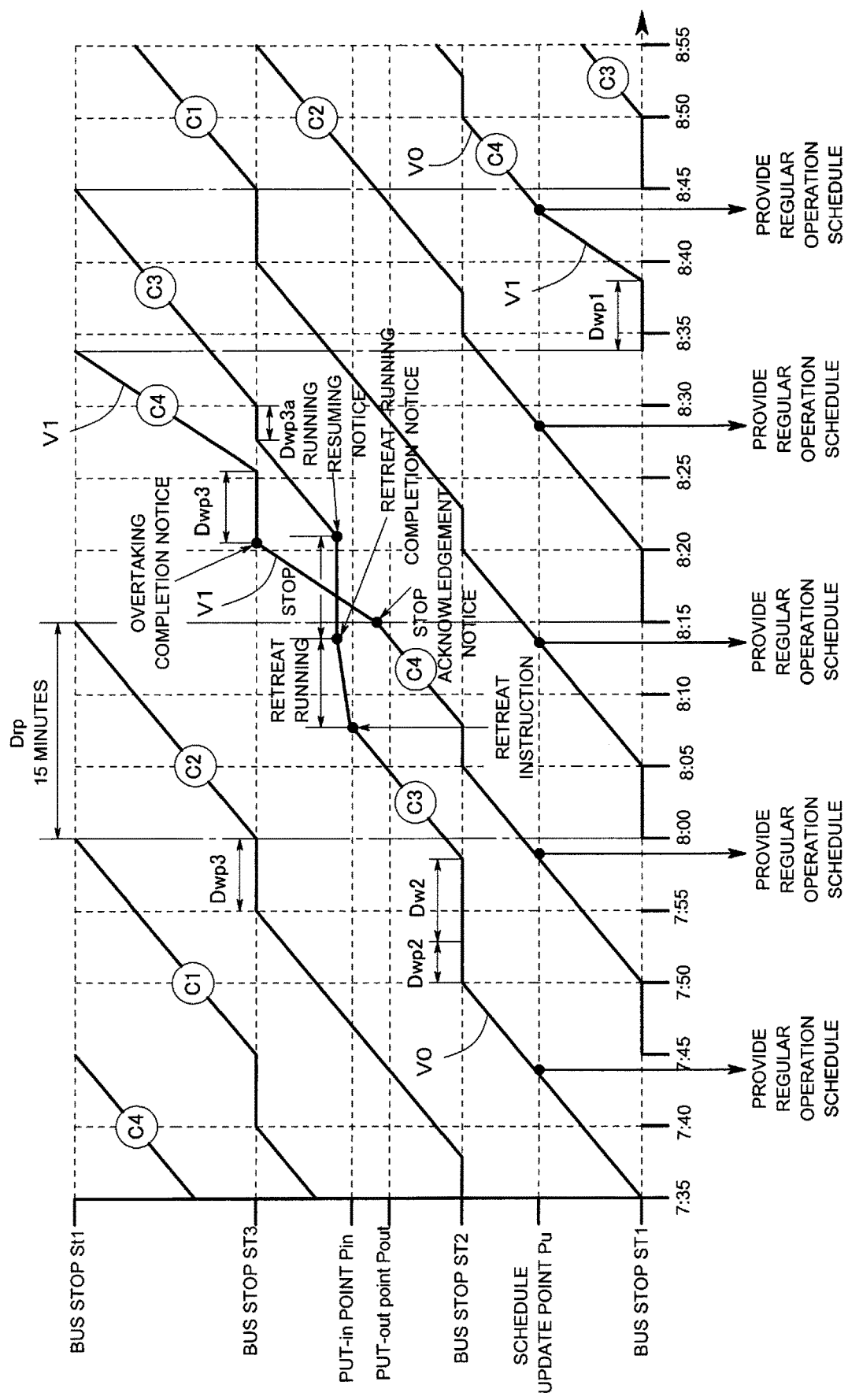
FIG. 14 is a diagram illustrating an exemplary diagram for the overtaking process according to the other example.

FIG. 13 is a flowchart of the overtaking process according to another embodiment. FIG. 14 illustrates an exemplary diagram for an overtaking process. In the overtaking process exemplified in FIG. 7, the operation management device 10 takes the initiative in managing overtaking. In contrast, in the overtaking process exemplified in FIG. 13, the delayed vehicle C3 and the overtaking vehicle C4 communicate with each other after receipt of an overtaking vehicle designation and a delayed vehicle instruction, to cooperatively execute overtaking.

As the process exemplified in FIG. 13 from the start to step S24, where the overtaking vehicle C4 outputs a feasible overtaking notice to the operation management device 10, is the same as that included in the flowchart in FIG. 7, these steps will not be described again.

The overtaking vehicle C4 outputs a retreat instruction to the delayed vehicle C3 (S60 in FIG. 13). In addition, the same instruction is outputted to the operation management device 10, or an administrator. The control unit 20 of the delayed vehicle C3 receives the retreat instruction, and then outputs an acknowledgement signal to the overtaking vehicle C4 and the operation management device 10 (S62 in FIG. 13).

Further, the delayed vehicle C3 switches the regular running control and executes retreat-running (S63 in FIG. 13). Upon completion of the retreat-running, a retreat completion notice is sent to the overtaking vehicle C4 and the operation management device 10 (S64 in FIG. 13). Upon receipt of the notice, the overtaking vehicle C4 outputs an acknowledgement signal to the delayed vehicle C3 and the operation management device 10 (S66 in FIG. 13). Further, the delayed vehicle C3 stops after having sent the retreat completion notice (S75 in FIG. 13).

Further, the delayed vehicle C3 outputs a stop acknowledgement signal to the overtaking vehicle C4 and the operation management device 10 (S68 in FIG. 13). The overtaking vehicle C4 outputs an acknowledgement signal to the delayed vehicle C3 and the operation management device 10 (S70 in FIG. 13). Thereafter, the automatic running control unit 46 of the overtaking vehicle C4 switches the regular operation control to execute overtaking running to overtake the delayed vehicle C3 (S71 in FIG. 13).

As described in the diagram in FIG. 14, the target speed V1 for overtake-running may be a faster speed than the target speed V0 defined according to the regular operation schedule. In overtake-running, while the delayed vehicle C3, recognized from the surrounding environment information obtained from the camera 22 (refer to FIG. 3) and the lidar unit 23 of the overtaking vehicle C4, is stopped, the automatic running control unit 46 of the overtaking vehicle C4 executes overtaking control.

After the overtaking vehicle C4 overtakes the delayed vehicle C3, the control unit 20 of the overtaking vehicle C4 outputs an overtaking completion notice to the operation management device 10 (S72 in FIG. 13). Upon receipt of the notice, the operation management device 10 outputs an acknowledgement signal to the overtaking vehicle C4 (S74 in FIG. 13).

Meanwhile, the scan data analysis unit 40 of the delayed vehicle C3 (refer to FIG. 3) obtains surrounding environment information from the camera 22 and the lidar unit 23 mounted in the forward direction of the vehicle; that is, forward in the running direction. Further, the scan data analysis unit 40 recognizes the overtaking vehicle C4, from the obtained surrounding environment information, and estimates the distance to the overtaking vehicle C4 from the vehicle carrying the scan data analysis unit 40.

Further, in the case where the estimated distance is equal to or longer than a predetermined distance; that is, where the overtaking vehicle C is located farther in the forward direction by a distance longer than a predetermined distance (S78 in FIG. 13), the automatic running control unit 46 releases the retreat control, and sends a running resuming notice to the operation management device 10 (S80 in FIG. 13). Upon receipt of the notice, the operation management device 10 sends an acknowledgement signal to the delayed vehicle C3 (S82 in FIG. 13). After completion of the overtaking, schedule adjustment described in FIG. 10 is executed relative to the overtaking vehicle C4. Similarly, schedule adjustment described in FIG. 12 is executed relative to the delayed vehicle C3. Further, the respective automatic running control units 46 of the delayed vehicle C3 and the overtaking vehicle C4 execute automatic running control based on the changed operation schedule (S76 and S84 in FIG. 13).

When closely located delayed vehicle and overtaking vehicle take the initiative in executing an overtaking process without intervention of the operation management device 10, as described above, for example, delay in communication with the operation management device 10 located far from these vehicles is prevented, which enables prompt overtaking.

The present disclosure is not limited to the present embodiments described above, and includes all changes and modifications without departing from the technical scope or the essence of the present disclosure defined by the claims.

The invention claimed is:

1. An automatic running vehicle for automatic running along a predetermined route that is a circulating route, comprising:
   an operation schedule memory that stores an operation schedule for one round of the predetermined route provided at an operation schedule update point provided on the predetermined route and updated every round, wherein the operation schedule includes a target update point passing time at which the automatic running vehicle passes through the operation schedule update point next time and an operation interval between automatic vehicles running along the predetermined route; and
   an electronic control unit that is configured to:
      execute regular operation control, based on the operation schedule provided from an operation management device,
      execute retreat control for moving to a retreat position on the predetermined route upon receipt of a retreat instruction from the operation management device or an overtaking vehicle that immediately follows the automatic running vehicle, and for stopping the automatic running vehicle at the retreat position;
      release the retreat control upon receipt of an overtaking completion notice from the operation management device; and
      change the operation schedule such that the target update point passing time is delayed by an amount corresponding to the operation interval, owing to overtaking by the overtaking vehicle.

2. The automatic running vehicle according to claim 1, further comprising a sensor for obtaining surrounding environment information in a forward direction, wherein
   when the overtaking vehicle is recognized, based on the surrounding environment information obtained by the sensor, at a position farther by a predetermined or longer distance in the forward direction, the electronic control unit releases the retreat control.

* * * * *